United States Patent [19]

Sansone et al.

[11] Patent Number: 4,814,399

[45] Date of Patent: Mar. 21, 1989

[54] SULFOALKYLATION OF POLYBENZIMIDAZOLE

[75] Inventors: Michael J. Sansone, Berkeley Heights; Balaram Gupta, North Plainfield, both of N.J.; Robert W. Stackman, Racine, Wis.

[73] Assignee: Hoechst Celanese Corporation, Somerville, N.J.

[21] Appl. No.: 77,271

[22] Filed: Jul. 24, 1987

[51] Int. Cl.$^4$ ............................................. C08G 73/18
[52] U.S. Cl. ..................... 525/435; 525/390; 525/420
[58] Field of Search ..................... 525/435, 420, 390

[56] References Cited

U.S. PATENT DOCUMENTS 3,842,044 10/1974 Cleary .................................. 528/313
4,666,996 5/1987 Sansone .............................. 525/435

Primary Examiner—Harold D. Anderson
Attorney, Agent, or Firm—Lynch, Cox, Gilman & Mahan

[57] ABSTRACT

A substituted polybenzimidazole polymer is disclosed wherein sulfoalkyl derivatives of polybenzimidazole are produced by the reaction of a polybenzimidazole polymer with a sultone. Beta sultones may be directly reacted with the polybenzimidazole polymer to produce a sulfoethyl derivative of polybenzimidazole. However, when gamma, delta or eta sultones are used, the polybenzimidazole polymer preferably is first reacted with an alkali hydride to produce the polyanion of polybenzimidazole. The polybenzimidazole polyanion is then reacted with the sultone to produce a sulfoalkyl derivative of polybenzimidazole polymer. These derivatives may find great use as ion exchange devices or for reverse osmosis or ultrafiltration devices.

28 Claims, No Drawings

SULFOALKYLATION OF POLYBENZIMIDAZOLE

BACKGROUND OF INVENTION

1. Field of Invention

This invention relates to substituted polybenzimidazole products and a process for their production. More particularly, this invention relates to sulfoalkyl derivatives of polybenzimidazole and a process for their production.

2. Prior Art

Polybenzimidazole polymers are a known class of heterocyclic polymers which are characterized by a high degree of thermal and chemical stability. Processes for their production are disclosed in U.S. Pat. No. Re. 26,065 and U.S. Pat. Nos. 3,331,783, 3,509,108 and 3,555,539 among others. Polybenzimidazole polymers have been formed into membranes, ultrafilters, ion exchange resins and for numerous other separatory devices.

Although polybenzimidazole polymers are generally more resistant to chemical reaction than other types of polymers, such as cellulose acetate polymers, under certain circumstances, reaction at the imidazole nitrogen-hydrogen bond will occur. One means of avoiding this reaction is to chemically modify the polybenzimidazole polymer, for example, by crosslinking the polymer as is disclosed in U.S. Pat. Nos. 4,020,142 and 4,154,919.

Another method of reducing the chemical reactivity of the polybenzimidazole polymer is by replacing the imidazole hydrogen with a less reactive substituent. For example, U.S. Pat. No. 4,377,546 discloses a substituted polybenzimidazole polymer wherein the hydrogen on the imidazole nitrogen has been replaced by a phenyl group. U.S. Pat. No. 3,578,644 discloses an hydroxyethyl substituent on a polybenzimidazole polymer produced by the reaction of a polybenzimidazole polymer with an omega-halo-alkanol or a 1,2-alkylene oxide. U.S. Pat. No. 4,599,388 also discloses a process for the production of hydroxyethylated polybenzimidazole polymers. However, none of these patents disclose sulfoalkyl derivatives of polybenzimidazole polymers.

U.S. Pat. No. 3,943,125 discloses a vast array of substituted polybenzimidazole polymers which are produced by the reaction of substituted tetramino pyridines or their acid salts with a suitable acid halide or dianhydride. The resulting precyclized intermediates are cyclodehydrated and crosslinked to produce various substituted polybenzimidazole polymers. However, the percentage of substitution of the polybenzimidazole polymers produced by this reaction ranges only between 20 and 40 percent of the available imidazole hydrogen sites. Further, the process of the '125 patent is significantly different from the process of the instant invention.

U.S. Pat. No. 3,518,234 discloses a process for the preparation of N-aryl substituted polybenzimidazole polymers. However, the substituted polybenzimidazole polymers are not produced by direct reaction with a polybenzimidazole polymer and substantial heating of the reaction vehicle is necessary. Further, no sulfoalkyl derivatives of polybenzimidazole are disclosed.

Technical reports published by Celanese Research Company (AD-755356, dated January, 1974) and Fabric Research Laboratories (AFML-TR-73-29, dated December, 1971) disclose a process for sulfonating polybenzimidazole fiber in order to reduce its thermal shrinkage. However, these reports do not disclose a process for sulfoalkylating polybenzimidazole by the process of the instant invention.

It is therefore an object of this invention to provide a process for the preparation of novel sulfoalkyl polybenzimidazole polymers.

It is an additional object of this invention to provide a process for the preparation of novel sulfoalkyl polybenzimidazole polymers using a sultone.

It is a further object of this invention is to prepare novel sulfoalkylated polybenzimidazole polymers that exhibit a high degree of chemical and thermal stability.

It is a still further object of this invention to prepare sulfoalkylated polybenzimidazole polymers for use as separatory devices.

These and other objects as well as the scope, nature and utilization of this invention are apparent to those skilled in the art from the following detailed description and appended claims.

SUMMARY OF INVENTION

The present invention discloses a process for the sulfoalkylation of polybenzimidazole polymers as follows:

a. preparing a polybenzimidazole polymer solvent solution; and b. reacting the polybenzimidazole polymer with a sultone to produce a sulfoalkylated polybenzimidazole polymer.

The sulfoalkylated polybenzimidazole polymers produced by this process can be formed into films, fibers and other such shaped articles similar to those produced from unsubstituted polybenzimidazoles polymers. However, because these polymers are substituted, products produced from them are highly resistant to chemical reaction. In addition, because the polymers are sulfonated, they are useful as ion exchange resins.

DETAILED DESCRIPTION OF INVENTION

A. Starting Material

The polybenzimidazole are a known class of heterocyclic polymers which are characterized by a recurring monomer unit which corresponds to the following Formula I or II. Formula I is:

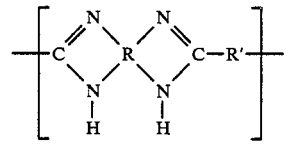

where R is a tetravalent aromatic nucleus with the nitrogen atoms forming the bibenzimidazole rings being paired upon adjacent carbon atoms, i.e., ortho carbon atoms, of the aromatic nucleus, and R' is a divalent substituent selected from aliphatic, alicyclic and aromatic radicals. Illustrative of R' substituents are divalent organic radicals containing between about 2-20 carbon atoms, such as ethylene, propylene, butylene, cyclohexylene, phenylene, pyridine, pyrazine, furan, thiophene, pyran, and the like.

Formula II corresponds to the structure:

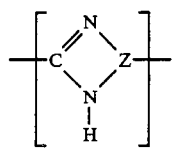

where Z is an aromatic nucleus having the nitrogen atoms forming the benzimidazole ring paired upon adjacent carbon atoms of the aromatic nucleus.

The above illustrated polybenzimidazoles can be prepared by various known processes, as described in the Background of Invention section.

Examples of polybenzimidazole which have the recurring structure of Formula I include:
poly-2,2'-(m-phenylene)-5,5'-bibenzimidazole;
poly-2,2'-(pyridylene-3",5")-5,5'-bibenzimidazole;
poly-2,2'-(furylene-2",5")-5,5'-bibenzimidazole;
poly-2,2'-(naphthalene-1",6")-5,5'-bibenzimidazole;
poly-2,2'-(biphenylene-4",4")-5,5'-bibenzimidazole;
poly-2,2'-amylene-5,5'-bibenzimidazole;
poly-2,2'-octamethylene-5,5'-bibenzimidazole;
poly-2,6'-(m-phenylene)-diimidazobenzene;
poly-2,2'-(m-phenylene)-5,5'-di(benzimidazole)ether;
poly-2,2'-(m-phenylene)-5,5'-di(benzimidazole)sulfide;
poly-2,2'-(m-phenylene)-5,5'-di(benzimidazole)sulfone;
poly-2,2'-(m-phenylene)-5,5'-di(benzimidazole)methane;
poly-2',2"-(m-phenylene)-5,5"-di(benzimidazole)-propane-2,2; and
poly-2,2'(m-phenylene)-5',5"-di(benzimidazole)-ethylene-1,2.

The preferred polybenzimidazole Formula I is poly-2,2'-(m-phenylene)-5,5'-bibenzimidazole as characterized by the recurring monomeric unit:

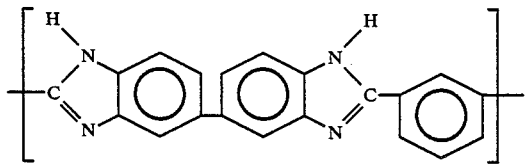

The polybenzimidazoles having the recurring monomeric unit of Formula II can be prepared by the autocondensation of at least one aromatic compound having a pair of amine substituents in an ortho position relative to each other and carboxylate ester group positioned upon an aromatic nucleus. Examples of such compounds are esters of diaminocarboxylic acids which include 3,4-diaminonaphthalene acid; 5,6-diaminonaphthalene-1-carboxylic acid; 5,6-diamino-naphthalene-2-carboxylic acid; 6,7-diaminonaphthalene-1-carboxylic acid; 6,7-diaminonaphthalene-2-carboxylic acid; and the like. A preferred compound is 4-phenoxycarbonyl-3',4'-diaminodiphenyl ether:

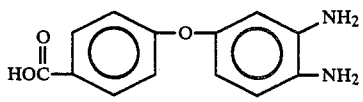

The polymer obtained with 4-phenoxycarbonyl-3',4'-diaminodiphenyl ether is poly-5-(4-phenyleneoxy)benzimidazole.

A polybenzimidazole starting material for the present invention process typically will exhibit an inherent viscosity between about 0.1–1.0 dl/g when measured at a concentration of 0.4 g of said polybenzimidazole in 100 ml of 97 percent sulfuric acid at 25° C.

The weight average molecular weight of a typical polybenzimidazole starting material will be in the range between about 1000–100,000.

B. The Polymer Solution

The solvents utilized to form the polybenzimidazole polymer solution include those solvents which are commonly recognized as being capable of dissolving typical unsubstituted polybenzimidazole polymers. For instance, the solvents may be selected from those commonly utilized in the formation of polybenzimidazole dry spinning solutions including N,N-dimethylacetamide, N,N-dimethylformamide, dimethylsulfoxide, and N-methyl-2-pyrrolidone. The particularly preferred solvents are N,N-dimethylacetamide and N-methyl-2-pyrrolidone. Additional representative solvents include formic acid, acetic acid, and sulfuric acid.

The polymer solution may be prepared, for example, by dissolving sufficient polybenzimidazole in the solvent to yield a final solution containing from about 1 to about 30 percent by weight of the polymer based on the total weight of the solution. When the solution contains concentrations of polybenzimidazole less than about 5 percent, the substitutions obtained are less than optimum. When concentrations of polybenzimidazole approach about 30 percent, the polybenzimidazole solution must be heated to complete the reaction with the sultone. Therefore, it is preferred that the concentration of polybenzimidazole in solution ranges from about 5 to about 20 percent by weight, based on the total weight of the solution. The quantity of polybenzimidazole dissolved in the solvent should be such that the resulting solution has a viscosity of about 50 to 4,000 poises at 30° C., and preferably from about 400 to about 600 poises.

One suitable means for dissolving the polymer in the solvent is by mixing the materials at a temperature above the normal boiling point of the solvent, for example, about 25° C. to 120° C. above such boiling point, and at a pressure of 2 to 15 atmospheres for a period of 1 to 5 hours under constant stirring. The resulting solution is preferably filtered to remove any undissolved polymer. A minor amount of lithium chloride (from about 0.5 to about 5 percent by weight based on the total weight of the solution) optionally may be provided to prevent the polybenzimidazole polymer from phasing out of the solution upon standing for extended periods of time.

C. The Sultone Reaction

The polybenzimidazole polymer in solution is next reacted with a sultone to produce an alkyl sulfonated polybenzimidazole derivative. Sultones are cyclic esters of sulfonic acid, analogous to carboxylic acid lactones. Beta, gamma, delta and eta sultones have been synthesized. As a relatively easily prepared reactive compound for introducing a sulfonate group onto other compounds, sultones have been useful in the synthesis of many products, for example, detergents, for the preparation of dyestuff intermediates, as surface active agents in textiles, and as insect repellants. Because of the high reactivity of sultones, a variety of compounds have been sulfoalkylated with sultones including inorganic salts, ammonia, amines, amides, phosphines, phosphoric acid esters, carboxylic acid salts, alcoholates, mercaptides and phenolates. For a general review of sultone chemistry, see Ahmed Mustafa, *Chemical Review,* pp. 195-223, (1954), which is incorporated herein by reference.

Although many types of sultones can be reacted with a polybenzimidazole polymer to produce useful sulfoalkylated products, the preferred sultones are beta (four member rings), gamma (five member ring), and delta (six member ring) sultones and the most preferred are beta sultones.

When beta sultones are employed as the sulfoalkylation agent, the sulfoalkylated polybenzimidazole polymer can be produced by a direct reaction between the polybenzimidazole polymer and the beta sultone. However, it has been surprisingly discovered that the reaction of gamma and delta sultones with a polybenzimidazole plymer is enhanced significantly by first reacting the polybenzimidazole polymer with an alkali hydride to create a polybenzimidazole polyanion by the following reaction process:

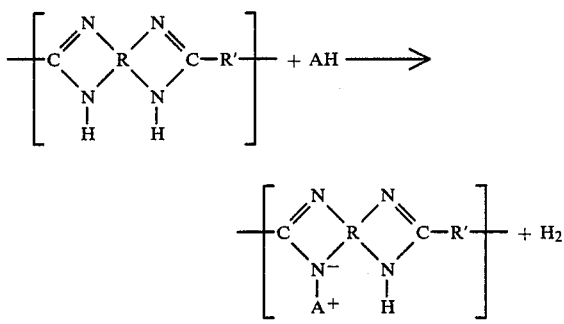

where R and R' are as previously disclosed and A is an alkali member selected from the group consisting of sodium, lithium and potassium.

Although any of the alkali hydrides may be employed in this reaction, the preferred hydride is lithium hydride, since its salts do not interferingly react with the polybenzimidazole polymer or its solvents, the anion pairing between the lithium cation and the polybenzimidazole anion is more reactive, and the lithium hydride reaction yields a polymer derivative which generally remains in solution.

When an alkali hydride is used to enhance the sultone reaction, a ratio of at least about 0.75 alkali hydride units for each imidazole nitrogen/hydrogen site on the polybenzimidazole molecule should be present in the reaction vessel. In a preferred embodiment, the ratio of the alkali hydride units to each imidazole nitrogen/hydrogen site ranges from about 1:1 to about 3:1. It is frequently useful to mix the alkali hydride with an equal quantity of the solvent used to produce the polybenzimidazole solvent solution prior to mixing the hydride with the polybenzimidazole solution to avoid localized precipitation.

The alkali hydride reaction is conducted at a temperature of about 40° C. to about 80° C. for a period of about 4 to about 12 hours. Since the hydride reaction generates hydrogen gas, completion of the reaction is generally disclosed when the hydrogen ceases bubbling from the solution. When the alkali hydride reaction is conducted as disclosed, at least about 40 percent of of the polybenzimidazole imidazole hydrogen sites are ionized, and preferably, at least about 60 percent.

Once the polybenzimidazole anion has been produced, quantities of the desired sultone are added to the reaction vessel. Using 1,3 propane sultone and the polybenzimidazole anion as the reactants, the reaction scheme is as follows:

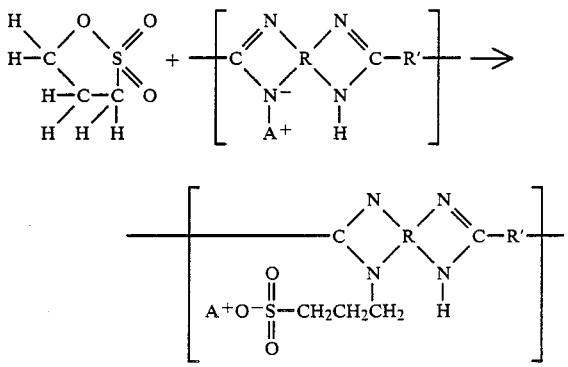

where R, R' and A are as previously defined.

At least a stoichiometric quantity of the sultone is added to the polybenzimidazole ion solution and, in a preferred embodiment, the sultone is present in a ratio of about 1:1 to about 4:1 for each available polybenzimidazole anion.

Sultones, which are usually in liquid form, can be directly added to the reaction vessel or they can be mixed with an equal quantity of the solvent for the polybenzimidazole polymer for ease of addition and to prevent localized precipitation. After addition of the sultone, the reaction vessel is heated to a temperature of about 40° C. to about 150° C. and the reaction is conducted at that temperature for a period of about 12 to about 72 hours. The temperature and time of the reaction will vary depending upon the type of sultone, the substituents on the sultone and the degree of substitution sought on the polybenzimidazole polymer. Larger ring sultones, such as eta sultones, or highly substituted sultones may require both longer reaction times and higher temperatures for the reaction to go to completion. Using a sufficient quantity of the chosen sultone and allowing the reaction to go to completion, substitutions of the available polybenzimidazole ion of at least about 40 percent and up to about 100 percent are generally produced.

Beta sultones useful in this reaction process have a general formula as follows:

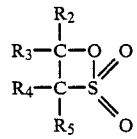

wherein $R_2$ and $R_3$ are the same as or different from each other and are selected from the group consisting of hydrogen, a halide or a $C_1$ to $C_3$ unsubstituted alkyl member, and $R_4$ and $R_5$ are the same as or different from each other and are selected from the group consisting of hydrogen, a halide, or a $C_1$ or $C_6$ substituted or unsubstituted alkyl member, with the preferred substitution being hydrogen. Examples of useful beta sultones include 2-hydroxy-1-propane sulfonic acid sultone, 2-hydroxy-1,1,2,2'-tetra-fluroethane sulfonic acid or 2- hydroxy-1,2-dichloro-1,2-ditrifluromethyl-propane sulfonic acid sultone with 2-hydroxy-1-propane sulfonic acid sultone the preferred beta sultone.

As previously mentioned beta sultones can be reacted directly with the polybenzimidazole polymer without the necessity of the alkali hydride reaction. The beta sultone reacts significantly better with the polybenzimidazole polymer than do larger ring sultones, presumably because of the steric strain of the 4 membered sultone ring.

The reaction scheme with 2-hydroxy-1-propane sulfonic acid sultone reacting directly with the polybenzimidazole polymer in solvent solution is as follows:

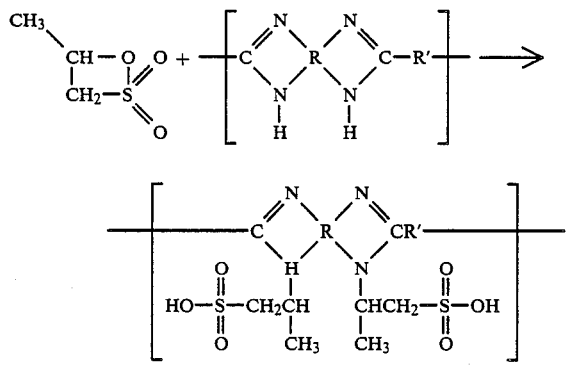

The gamma and delta sultones which are useful in carrying out the process of the instant invention may be characterized by the following general formula:

wherein $R_7$ is a divalent substituted or unsubstituted $C_3$ or $C_4$ alkyl member wherein the substituents may be the same as or different from each other and are selected from the group consisting of hydrogen, halides, and $C_1$ to $C_6$ substituted or unsubstituted alkyl groups, with the preferred substituent being hydrogen. In a preferred embodiment, the carbon atom adjacent to the oxygen on the sultone ring must be either unsubstituted or substituted with a halide or a unsubstituted $C_1$ to $C_3$ alkyl members. Among the preferred gamma and delta sultones are 3-hydroxy-1-propane sulfonic acid sultone and 4-hydroxy-butane sulfonic acid sultone. As previously stated, higher reaction temperatures or longer reaction times may be necessary for the reaction with a gamma or a delta sultone to go to completion than with a beta sultone.

When polybenzimidazole polymers of Formula I are used, the alkyl sulfonated polybenzimidazole polymers produced by this process have a general formula of:

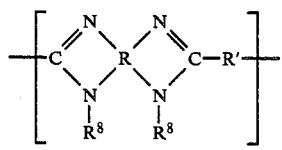

where R and R' are as previously disclosed and $R_8$ is a $C_2$ to $C_4$ substituted or unsubstituted alkyl member wherein the substituents may be the same as or different from each other and are selected from the group consisting of hydrogen, halides and $C_1$ to $C_6$ unsubstituted alkyl members. In a preferred embodiment the $C_2$ to $C_4$ alkyl member is unsubstituted.

Once the reaction has gone to completion, the sulfoalkyl derivative of the polybenzimidazole polymer may be recovered from the reaction vessel by the addition of any conventional precipitating agent for substituted polybenzimidazole derivatives such as water or acetone. After washing and drying the precipitate by well-known procedures, such as washing the precipitate with acetone or water and air drying it for about 2 to about 24 hours, the alkyl sulfonated polybenzimidazole polymer recovered may be used for a variety of end uses including spinning it into a fiber, or casting it into a film. In a particularly preferred end use, it may be formed into an ion exchange device. The slkylsulfonated polybenzimidazole polymers are also useful for forming reverse osmosis or ultrafiltration separatory articles.

The following Example is given as a specific illustration of the invention. All parts and percentages are by weight unless otherwise stated. It is understood, however, that the invention is not limited to the specific details as set forth in the Example.

EXAMPLE

To a round bottom reaction flask was added 9.62 grams of poly 2,2'-(m-phenylene)-5,5'-bibenzimidazole (0.77 i.v.) dissolved in 86.48 grams of N,-methyl-2-pyrrolidone. Following the addition of 0.6 grams of lithium hydride, the solution was heated to 70° C. and maintained at that temperature for 12 hours. After all the bubbling had ceased, 7.62 grams of 3-hydroxy-1-propane sulfonic acid sultone mixed with 4.5 grams of N-methyl-2-pyrrolidone were added dropwise by an addition funnel to the reaction vessel. The contents were heated to 70° C. and maintained at that temperature for 12 hours under constant stirring. A 5.0 gm sample was withdrawn from the reaction vessel and precipitated by the addition of 20.0 gms of acetone. Using nuclear magnetic resonance spectroscopy, the precipitate was analyzed and it showed a 72 percent substitution on the available polybenzimidazole imidazole site of the sulfopropyl substituent.

As is apparent from this reaction process, sulfoalkyl derivatives of polybenzimidazole can be easily produced with a high degree of substitution by the reaction of a sultone with a polybenzimidazole polymer.

We claim:

1. A process for preparing a substituted polybenzimidazole polymer comprising the steps of:
   a. preparing a polybenzimidazole polymer solvent solution; and
   b. reacting the polybenzimidazole polymer with a beta sultone having the general formula:

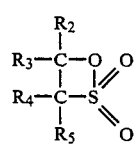

wherein $R_2$ and $R_3$ are the same as or different from each other and are selected from the group consisting of hydrogen, halides, or a $C_1$ to $C_3$ unsubstituted alkyl group and $R_4$ and $R_5$ are the same as or different from each other and are selected from the group consisting of hydrogen, a halide or a $C_1$ to $C_6$ substituted or unsubstituted alkyl substituent to produce an N-substituted sulfopropyl derivative of the polybenzimidazole polymer.

2. A process for preparing a substituted polybenzimidazole polymer comprising the steps of:
 a. preparing a polybenzimidazole polymer solvent solution;
 b. mixing with the polybenzimidazole polymer an alkali hydride to produce a polybenzimidazole polyanion; and
 c. reacting the polybenzimidazole polyanion with a sultone having the general formula:

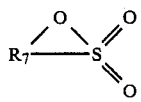

wherein $R_7$ is a divalent substituted or unsubstituted $C_3$ or $C_4$ alkyl member wherein the substituents are the same as or different from each other and are selected from the group consisting of hydrogen, halides and $C_1$ to $C_3$ substituted or unsubstituted alkyl groups to produce a sulfoalkyl derivative of the polybenzimidazole polymer.

3. The process of claim 1 wherein the sultone is 2-hydroxy-1-propane sulfonic acid sultone.

4. The process as in any of claim 2 wherein the sultone is 3-hydroxy-1-propane sulfonic acid sultone.

5. The process as in any of claims 1 or 2 wherein the polybenzimidazole polymer starting material is comprised of recurring monomeric units of:

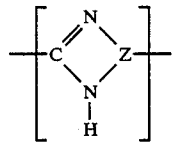

wherein Z is an aromatic nucleus having the nitrogen atoms forming the benzimidazole ring paired upon adjacent carbon atoms of the aromatic nucleus.

6. The process as in any of claims 1 or 2 wherein the polybenzimidazole polymer is poly-2,2'-(m-phenylene)-5,5'-bibenzimidazole.

7. The process as in any of claims 1 or 2 wherein at least about 40 percent of the reactive imidazole nitrogen-hydrogen sites are substituted with a sulfoalkyl substituent.

8. The process as in any of claims 1 or 2 wherein the concentration of the polybenzimidazole in the solvent solution is from about 5 to about 20 percent by weight based on the total solution weight.

9. The process as in any of claims 1 or 2 wherein the sultone is present in at least a stoichiometric quantity with respect to the imidazole nitrogen-hydrogen sites.

10. The process as in any of claims 1 or 2 wherein the ratio of the sultone to each imidazole nitrogen-hydrogen site on the polybenzimidazole polymer is from about 1:1 to about 4:1.

11. The process as in any of claims 1 or 2 wherein the sultone reaction is conducted at a temperature from about 40° C. to about 150° C. for a period from about 12 to about 72 hours.

12. The process of claim 2 wherein the alkali hydride is selected from the group consisting of sodium hydride, lithium hydride and potassium hydride.

13. The process of claim 2 wherein the alkali hydride is lithium hydride.

14. The process of claim 2 wherein the alkali hydride is mixed with the polybenzimidazole solvent solution for a period from about 4 to about 12 hours, heated to a temperature from about 40° C. to about 120° C. and maintained at that temperature.

15. The process of claim 2 wherein at least about 0.75 alkali hydride units are present for each imidazole nitrogen-hydrogen site on the polybenzimidazole polymer.

16. The process of claim 2 wherein the ratio of the alkali hydride units to the polybenzimidazole imidazole nitrogen-hydrogen sites ranges from about 1:1 to about 3:1.

17. The process as in any of claims 1 or 2 wherein the polybenzimidazole polymer consists essentially of recurring units of the formula:

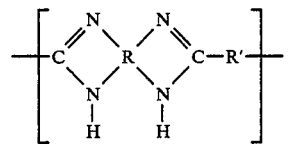

where R is a tetravalent aromatic nucleus with the nitrogen atoms forming the bibenzimidazole rings being paired upon adjacent carbon atoms of the aromatic nucleus, and R' is a divalent substituent selected from aliphatic, alicyclic or aromatic radicals.

18. An N-sulfopropyl substituted polybenzimidazole polymer produced by the process of claim 1.

19. An N-sulfoalkyl derivative of polybenzimidazole produced by the process of claim 2.

20. A process for preparing a substituted polybenzimidazole polymer comprising the steps of:
 a. preparing a solvent solution containing about a 5 to about a 20 percent by weight based on the total solution weight of poly-2,2'-(m-phenylene)5,5' bibenzimidazole; and
 b. reacting the polymer with 2-hydroxy-1-propane sulfonic acid sultone to produce sulfopropyl polybenzimidazole polymer.

21. An N-sulfopropyl derivative of polybenzimidazole produced by the process of claim 20.

22. A process for preparing a substituted polybenzimidazole polymer comprising the steps of:
 a. preparing a poly-2,2'-(m-phenylene)5,5'-bibenzimidazole polymer solution wherein the concentration of the polymer in the solvent solution is from about 5 to about 20 percent by weight based on the total solution weight;
 b. mixing lithium hydride with the polymer solution wherein the ratio of the lithium hydride to the polybenzimidazole imidazole nitrogen-hydrogen sites ranges from about 1:1 to about 3:1, to produce a polybenzimidazole polyanion; and
 c. reacting the polybenzimidazole polyanion with 3-hydroxy-1-propane sulfonic acid sultone wherein at least a stoichiometric quantity of the sultone is present in relation to the available polybenzimidazole polyanion sites to produce a sulfopropyl derivative of the polybenzimidazole polymer.

23. An N-sulfopropyl derivative of polybenzimidazole produced by the process of claim 22.

24. An N-substituted sulfonated polybenzimidazole polymer having units of the general formula:

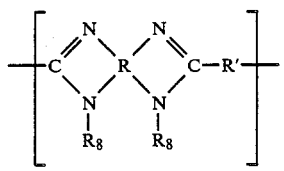

where R is a tetravalent aromatic nucleus with the nitrogen atoms forming the bibenzimidazole rings being paired upon adjacent carbon atoms of the aromatic nucleus; R' is a divalent substituent selected from aliphatic, alicyclic or aromatic radicals; and $R_8$ is a $C_2$ to $C_4$ substituted or unsubstituted alkyl member, wherein the substituents are the same as or different from each other and are selected from the group consisting of hydrogen, halides and $C_1$ to $C_6$ unsubstituted alkyl members.

25. A process for preparing a substituted polybenzimidazole polymer comprising the steps of:
   a. preparing a solvent solution containing about a 5 to about a 20 percent by weight based on the total solution weight of a polybenzimidazole polymer wherein the polybenzimidazole polymer consists essentially of recurring units of the formula:

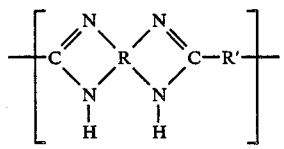

where R is a tetravalent aromatic nucleus with the nitrogen atoms forming the bibenzimidazole rings being paired upon adjacent carbon atoms of the aromatic nucleus, and R' is a divalent substituent selected from aliphatic, alicyclic or aromatic radicals
   b. reacting the polybenzimidazole polymer with a beta sultone having the general formula:

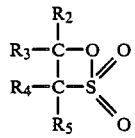

wherein $R_2$ and $R_3$ are the same as or different from each other and are selected from the group consisting of hydrogen, halides, or $C_1$ to $C_3$ unsubstituted alkyl groups and $R_4$ and $R_5$ are the same as or different from each other and are selected from the group consisting of hydrogen, halides, and $C_1$ to $C_6$ substituted or unsubstituted alkyl substituents to produce a sulfoethyl derivative of the polybenzimidazole polymer.

26. A process for preparing a substituted polybenzimidazole polymer comprising the steps of:
   a. preparing a polybenzimidazole polymer solvent solution wherein the polybenzimidazole polymer consists essentially of recurring units of the formula:

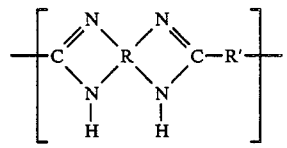

where R is a tetravalent aromatic nucleus with the nitrogen atoms forming the bibenzimidazole rings being paired upon adjacent carbon atoms of the aromatic nucleus, and R' is a divalent substituent selected from aliphatic, alicyclic or aromatic radicals;
   b. mixing with the polybenzimidazole polymer on alkali hydride selected from the group consisting of sodium hydride, lithium hydride and potassium hydride wherein at least about 0.75 alkali hydride units are present for each imidazole nitrogen-hydogen site on the polybenzimidazole polymer to produce a polybenzimidazole polyanion; and
   c. reacting the polybenzimidazole polyanion with a sultone having the general formula of:

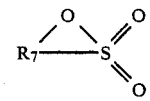

wherein $R_7$ is a divalent substituted or unsubstituted $C_3$ or $C_4$ alkyl member wherein the substituent may be the same as or different from each other and is selected from the group consisting of hydrogen, halides and $C_1$ to $C_3$ substituted or unsubstituted alkyl groups to produce a sulfoalkyl derivative of the polybenzimidazole polymer.

27. An N-sulfoethyl derivative of polybenzimidazole produced by the process of claim 25.

28. An N-sulfoalkyl derivative of polybenzimidazole produced by the process of claim 26.

* * * * *